United States Patent
Nestler et al.

[11] Patent Number: 6,160,759
[45] Date of Patent: Dec. 12, 2000

[54] METHOD FOR DETERMINING PROBABLE RESPONSE OF AQUATIC SPECIES TO SELECTED COMPONENTS OF WATER FLOW FIELDS

[76] Inventors: John Michael Nestler, 102 Lakewood Cir., Vicksburg, Miss. 39180; Richard Andrew Goodwin, 4403 Olando La., Bowie, Md. 20715

[21] Appl. No.: 09/293,771

[22] Filed: Apr. 19, 1999

[51] Int. Cl.[7] .................................................. G10K 1/00
[52] U.S. Cl. ............................................................ 367/139
[58] Field of Search .............................. 367/139; 43/17.1; 116/22 A

[56] References Cited

U.S. PATENT DOCUMENTS

| | | | |
|---|---|---|---|
| 4,646,276 | 2/1987 | Kowalewski et al. | 367/139 |
| 4,922,468 | 5/1990 | Menezes | 367/139 |
| 4,932,007 | 6/1990 | Suomala | 367/139 |
| 5,517,465 | 5/1996 | Nestler et al. | 367/139 |
| 5,675,555 | 10/1997 | Evans et al. | 367/139 |
| 5,812,421 | 9/1998 | Fujii et al. | 364/510 |
| 6,038,494 | 3/2000 | Fisher, Jr. et al. | 700/287 |

*Primary Examiner*—Ian J. Lobo
*Attorney, Agent, or Firm*—Luke Marsh; John MacEvoy

[57] ABSTRACT

A method for determining the probable response of aquatic species to selected components of water flow fields, comprising the steps of obtaining data for identifying travel and quantitatively describing behavior of real fish constituting members of a selected aquatic species in a flow field, determining passive transport trajectories of the members of the aquatic species in the flow field to establish a basis from which to determine swim path selections, developing postulated behavioral responses of members of the aquatic species to at least one of hydraulic and acoustic stimuli, using statistical rules, and developing a computer utilizing the travel behavior data, the passive transport trajectories, and the postulated behavioral responses, to provide a virtual fish. The method further includes the steps of obtaining data on at least one selected hydraulic flow field component to generate a virtual hydraulic flow field, generating a simulative application of a multiplicity of virtual fish to the virtual hydraulic flow field, and tracking and monitoring the virtual fish through the virtual flow field, and summarizing results as to the numbers of virtual fish entering and exiting the virtual flow field, whereby to determine probable efficiency of real fish passage through the real hydraulic flow field.

16 Claims, 9 Drawing Sheets

| Alternative | Percent Efficiency per 1000 (# passed divided by total) | Cost ($) | Incremental (unit) Cost ($) |
|---|---|---|---|
| 5,000 cfs Operation | 32 | 0.50M | 1562 |
| Wide Bypass | 55 | 0.75M | 1364 |
| Narrow Bypass | 35 | 0.55M | 1571 |
| Screen | 62 | 1.00M | 1613 |

*FIG. 9*

METHOD FOR DETERMINING PROBABLE RESPONSE OF AQUATIC SPECIES TO SELECTED COMPONENTS OF WATER FLOW FIELDS

BACKGROUND OF THE INVENTION

1. Field of the Invention

The invention relates to development and preservation of living water resources and is directed more particularly to a method for preserving and encouraging development of aquatic species, such as fish, turtles, large invertebrates (such as shrimp, prawns, and lobsters), and other aquatic species that travel through freshwater estuaries, and other marine environments.

2. Description of the Prior Art

Sustainable water resources development is facilitated by the use of hydraulic structures to: 1) pass adult fish around dams or other channel obstructions so they can migrate to their historical spawning and nursery areas, 2) pass juvenile fish around channel obstructions to their adult habitat areas, and 3) physically exclude fish from turbine, pump, or dredge intakes where they can be injured or killed. Methods presently used to design, site, and operate these structures are inadequate for many applications.

The design of hydraulic structures for fish passage and protection typically involves the selection and implementation of a number of design elements in order to develop the fully operational system. Hydraulically-based fish passage structures typically include varying designs of components, such as diversion screens, orifices, fish ladders, surface collectors, navigation locks, and other structures whose primary or secondary function is to facilitate movement of fish around a dam or other channel obstruction. Fish protection devices include physical exclusion structures, behavioral devices using light and sound, and special operating techniques for hydraulic structures whose mere existence potentially influences the behavior of fish. Fish protection structures are typically used to prevent fish entry into hydroturbines, irrigation intakes, and dredge heads. Once a system is designed, it must be optimally sized, sited, and operated for maximum efficiency. Currently, methods available to aid selection of design alternatives are relatively crude. Methods for integrating design elements into a complete fish passage or protection system are nonexistent or merely anecdotal, and there is little available for optimal siting of the structures and their operation.

Hydraulic structures for fish passage and protection are currently designed by combining assumptions, or criteria, of fish behavior with bulk flow characteristics of the hydraulic flow field, as predicted by mathematical hydraulic models, measured in scaled physical hydraulic models, or measured at existing structures. Model-predicted or measured hydraulic data are integrated with these assumptions, or criteria, to design structures that will pass fish around obstructions in rivers and lakes, or prevent their entry into hydro-turbines, pumps, dredges, or other mechanical structures that can injure or kill them. Unfortunately, systematic application of these assumptions and criteria does not guarantee that efficient designs, sites, or operations will be identified and selected. Numerous unsuccessful fish passage and protection structures, costing many millions of dollars, have been constructed. The inefficiency of the design process, coupled with the endangered or threatened status of many fish species, requires that the present qualitative process of designing fish passage and protection technologies be considerably improved to insure the protection and restoration of the nation's aquatic natural resources. In addition, because presently used methods are qualitative, they cannot be easily included into population, community, water quality, or ecosystem models that are typically used to predict and evaluate the environmental consequences of different fish passage and protection strategies.

The literature available to describe the response of fish to flow fields is dominated by the reliance of studies on simple stream gaging methods for describing the position of fish in hydraulic nets. That is, the position of the fish is described in terms of velocity and depth at the point of measurement, or as an average of cell velocity and cell depth. Unfortunately, this type of hydraulic characterization for habitat description and modeling is insufficient to capture the complexity of fish behavior in complicated hydraulic fields.

The success of fish passage hydraulic structures must be based on the creation of hydraulic patterns that: 1) attract fish to optimal areas for passage, 2) induce fish to enter into the fishway structure, 3) encourage fish to successfully pass through the structure, 4) create exit conditions that prevent fish from loitering in the fishway, and 5) discourage fish from turning in the wrong direction after they depart from the fishway. The state-of-the-art provides no quantitative method for selecting from competing designs to achieve steps 1–5 above. The success of fish protection hydraulic structures must be based on the creation of hydraulic patterns that discourage fish from entering regions of the hydraulic structure where they can be injured or killed and/or prevent and minimize their physical impact with a protection device.

The lack of systematic success and, in some cases, the failure of fish passage and protection structures, prove that guiding concepts employed to design such structures must be significantly enhanced. Evaluation of the prior art design process for fish passage and protection structures indicates that a major source of uncertainty occurs in the qualitative or anecdotal methods used to relate fish behavior to predicted or measured hydraulic fields. Therefore, fish behavior is not rigorously included in the design selection process for fish passage and fish protection systems. It is enticing to apply anthropomorphic logic to bulk flow patterns as the basis for selecting design alternatives because the flow patterns can be easily visualized in plan view in physical models and in plan view or profile view in mathematical hydraulic models. Unfortunately, the information content of bulk flow patterns that are so obvious to researchers observing physical models or inspecting the output of mathematical hydraulic models is not available to fish because of the limitations and capabilities of fish sensory systems. Fish are embedded in the fluid medium and are much more likely to utilize or be restricted to the information they can acquire in their immediate hydraulic surrounding as they select a swim path through the complex hydraulic and acoustic environment generated by fish protection and passage structures. Fish may be completely unaware of the overall hydraulic pattern because the large-scale bulk flow pattern so obvious to engineers and biologists when visualizing flow fields, is unavailable to organisms imbedded in the fluid medium.

There is thus a need for a method for designing fish passageways, which method integrates several technologies, to optimally design, locate, and operate fish passage and protection structures, and which includes fish behavior in the design of hydraulic structures used to pass or protect fish and other aquatic organisms.

SUMMARY OF THE INVENTION

An object of the invention is, therefore, to provide a method for determining probable response of aquatic species to selected components of water flow fields, which, in turn, provides for comparative testing of alternative designs of flow passages and flow passage components, without the need for build-and-test undertakings.

The method creates multiple virtual fish that are programmed to respond to elements of virtual hydraulic fields in a manner consistent with the response of real fish to elements of real hydrodynamic and acoustical fields. In addition to creating or altering hydraulic fields, the vibration of hydraulic structures, as water flows through them, may also generate an extensive acoustic field. An octavo-lateralis system that a fish uses to detect and process hydraulic information in its surroundings is also employed to detect and process acoustic information. Since fish use a common system to acquire both hydrodynamic and acoustic information, the invention can be used to predict the response of fish to both acoustic and hydrodynamic fields. Although the invention is described principally in terms of a response of a fish to hydraulic fields, it can also be used to predict fish responses to acoustic fields, since the same steps of the methodology are involved.

The method is implemented using a computer model which contains the elements of the invention. The method requires detailed descriptions of the hydraulic field associated with each design alternative. This hydraulic information can be obtained from mathematical hydraulic models, physical hydraulic models, or field measurements at prototype structures. The method predicts the swim path of virtual fish in a simulated or measured hydraulic field. The method tallies the number of virtual fish successfully utilizing the fish passage system, or the number of fish diverted, and then compares the tallied number to the total number of virtual fish released into the simulated system. The best alternative can then be quantitatively identified as having the highest proportion of fishes passed or protected. If the cost of each alternative is known, then an incremental cost analysis can be performed to identify the best alternative on an individual fish basis.

A further object of the invention is to provide a method which includes fish behavior in optimally designing, siting, and operating fish passage and protection structures. Specifically, a method which provides a way to develop and utilize stimuli-response relationships ("traffic rules") for fish, to allow their swim path selection to be rigorously predicted using the output of mathematical hydraulic models, measurements from physical scale models, or measurements made at prototype structures. Quantitatively describing fish response to flow fields associated with different design alternatives allows the efficiency of each alternative to be evaluated with a computer using virtual fish. This avoids the expensive and inefficient "build and test" paradigm presently dominating the design-build process for fish passage and protection structures. In addition, the method can be linked to, or embedded into, population, community, water quality, and ecosystem models to allow impacts of different designs to be predicted and evaluated as part of environmental impact assessment.

With the above and other objects in view, as will hereinafter appear, a feature of the present invention is the provision of a method for determining probable response of aquatic species to selected components of water flow fields. The method includes the steps of obtaining data for identifying and quantitatively describing travel behavior of real fish constituting members of a selected aquatic species in a flow field, determining passive transport trajectories of members of the aquatic species using data on the flow field to establish a basis from which to determine swim path selections, developing postulated behavioral responses of members of the aquatic species to at least one of hydraulic and acoustic stimuli using statistical rules, and developing a computer program utilizing the travel behavior data, the passive transport trajectories, and the postulated behavioral responses, to provide a virtual fish. The method further includes obtaining data on at least one selected hydraulic flow field component to generate a virtual hydraulic flow field, generating a simulative application of a multiplicity of virtual fish to the virtual hydraulic flow field, tracking and monitoring the virtual fish through the flow field, and summarizing results as to the numbers of virtual fish entering and exiting through specific locations of the virtual flow field, whereby to determine probable efficiency of real fish passage through the real hydraulic flow field.

The above and other features of the invention, including various novel details and combinations of method steps, will now be more particularly described with reference to the accompanying drawings and pointed out in the claims. It will be understood that the particular method embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings:

In FIG. 6C passive transport is transformed into a fish swim path;

FIG. 9 is a chart representative of a summary output of a virtual hydraulic flow path with selected structural or operational components therein.

DESCRIPTION OF THE PREFERRED EMBODIMENT

Figure 1:
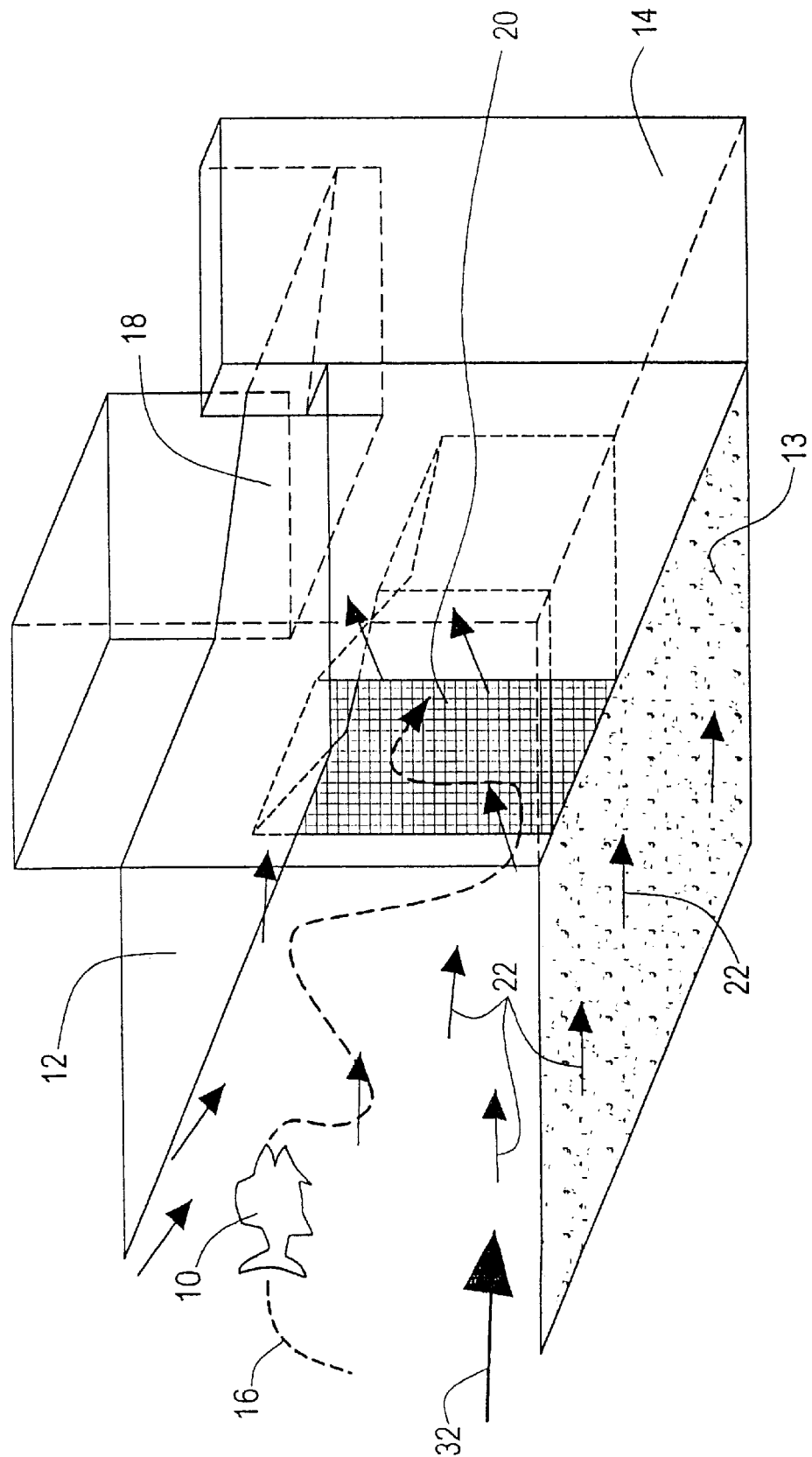
FIG. 1 is a diagrammatical representation of a typical prior art fish passage structure in which juvenile fish move downstream toward their habitat.

Referring to FIG. 1, it will be seen that in a typical fish passage structure juvenile fish 10 instinctively move downstream through a flow path, such as a river 12 over a river bottom 13, until they reach their adult habitat (not shown). When their migration route is blocked by a dam 14, or other structure, they seek passage through the structure. In this scenario, a management goal is to pass as many juvenile fish 10 as possible through a surface bypass 18 and minimize their entry into a turbine intake 20. A secondary goal usually is to minimize the amount of time the fish 10 loiter upstream before passing through the bypass structure 18. The standard procedure is to develop detailed hydraulic information, represented in FIG. 1 for simplicity as velocity vectors 22 in one plane although much more detailed hydraulic information is typically available to guide the design of the fish passage structure 18. However, the detailed hydraulic information is usually combined with qualitative or anecdotal information about fish behavior. Fish behavior information is usually summarized in terms of preferred entrance velocities or a similar crude hydraulic criterion. Fish behavior (represented by the convoluted trajectory 16 in FIG. 1) is considerably more complicated than can be represented by simple approach velocity criterion. In short, detailed hydraulic information collected for the design of the dam 14 and bypass 18 is poorly utilized. Design of the fish passage system can be considerably enhanced by use of virtual fish encoded with realistic behavioral rules and used to evaluate the effectiveness of each different design or operational alternative.

Figure 2:
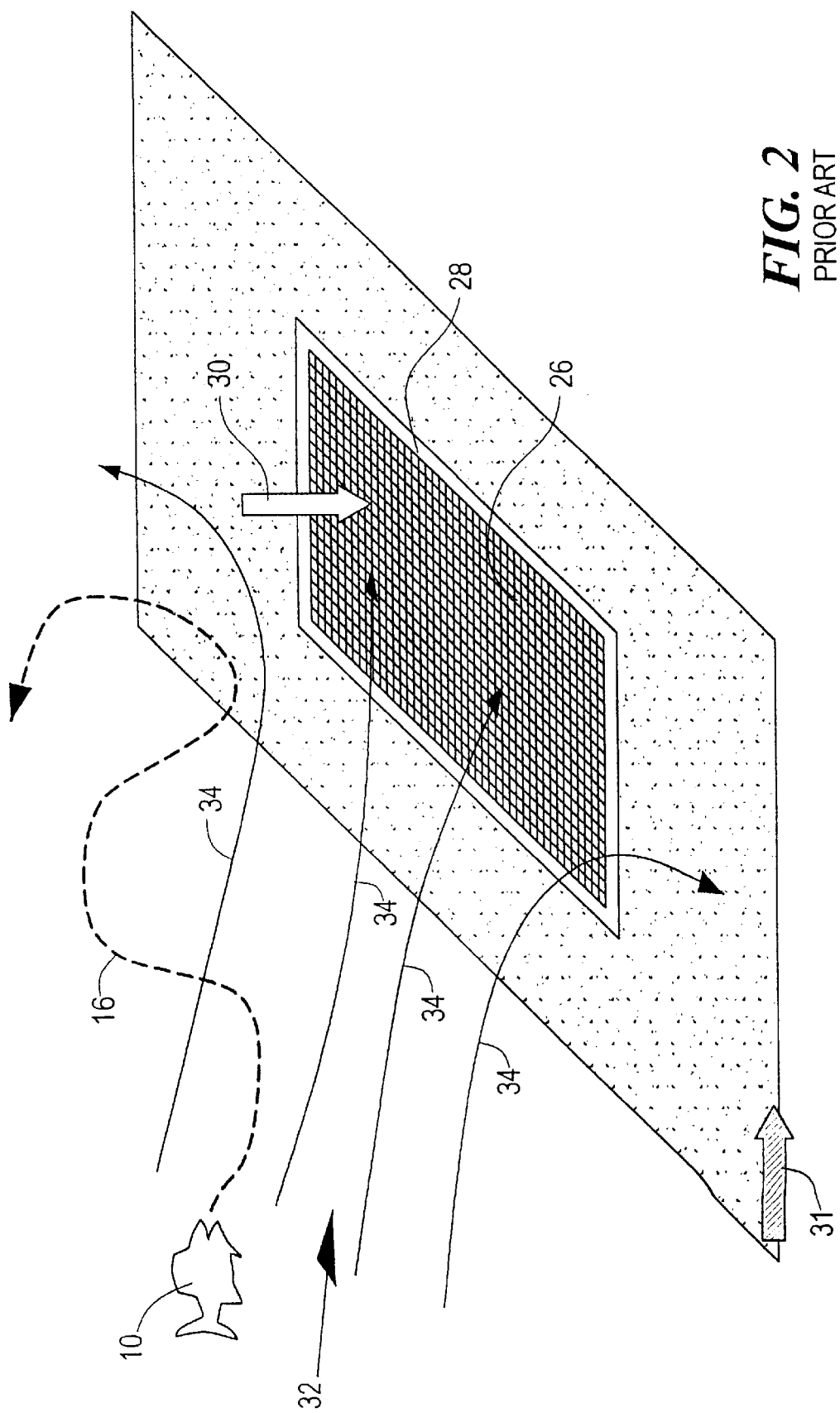
FIG. 2 is a diagrammatical representation of a typical prior art fish protection system in which fish are physically blocked by a screen, to prevent their entering a pump or turbine intake.

Referring to FIG. 2, it will be seen that in a typical fish protection system fish are physically blocked by a screen 26 to prevent them from entering into a pump or turbine intake 28. For this example, a management goal is to design the screen 26 to minimize entrainment of fish 10 and their resultant impingement on the screen 26. Entrainment is defined as the capture of fish by the water current entering the intake opening. Many species of fish are unable to dislodge themselves once they are impinged on the screen surface. They subsequently die because the force of the water prevents them from escaping from the screen surface. Although detailed hydraulic information is often collected as part of the design process, it is seldom used beyond calculations of water velocities 30 normal to the screen surface 26 and for calculating sweeping flows 31 across the screen surface used to carry fouling material and fish past the screen 26. In short, detailed hydraulic information currently is not used efficiently in the design process because fish behavioral information is so crude with respect to the hydraulic information. Design of a fish protection system can be considerably enhanced by use of virtual fish encoded with realistic behavioral rules and used to evaluate the effectiveness of each design or operational scenario.

Complex flow fields 32, often modified by landscape and waterscape development, can be summarized as patterns of stream lines 34, flow vectors/velocities 30 and 31, and other derivatives of the flow field. The method herein includes evaluation of the response of aquatic species to carefully selected components of the flow fields, in a manner consistent with flow descriptions obtained from mathematical or physical hydraulic models or field measurement. A numerical fish surrogate (NFS), or "virtual fish" mimics the behavior of target aquatic species based on hydraulic information to simulate the dynamics of the aquatic environment. The NFS enables exploration and quantification of responses of virtual fish to simulated or measured flow fields 32 produced by the hydraulic structure.

The method of the invention consists of seven integrated steps (FIG. 3): (1) obtaining data for identifying and quantitatively describing travel behavior of real fish, constituting members of a selected aquatic species in a flow field, (2) determining passive transport trajectories of members of the aquatic species using data on the flow field to establish a basis from which to determine swim path selections, (3) developing postulated behavioral responses of members of the aquatic species to at least one of hydraulic and acoustic stimuli using statistical rules, (4) developing a computer program utilizing the travel behavior data, the passive transport trajectories, and the postulated behavior responses to provide a virtual fish, (5) obtaining data on at least one selected hydraulic flow field component to generate a virtual hydraulic flow field, (6) generating a simulative application of a multiplicity of virtual fish to the virtual hydraulic flow field, and tracking and monitoring the virtual fish through the virtual flow field, and (7) summarizing results as to the numbers of the virtual fish entering and exiting through specific locations of the selected flow field, whereby to determine efficiency of real fish passage through the real hydraulic flow field.

Step 1—Obtaining Data for Identifying and Quantitatively Describing Travel Behavior of Real Fish Constituting Members of a Selected Aquatic Species in a Flow Field Relatively high-resolution travel behavioral data, equal in resolution to available hydraulic data, are required to implement the invention. The behavioral data needed may include published data, and field data which consist of time series of target fish locations collected concurrently with information describing the hydraulic (or acoustic) field in which the target fish is embedded. Alternatively, hydraulic (or acoustic) data can also be obtained from numerical or physical hydraulic models.

Figure 4A:
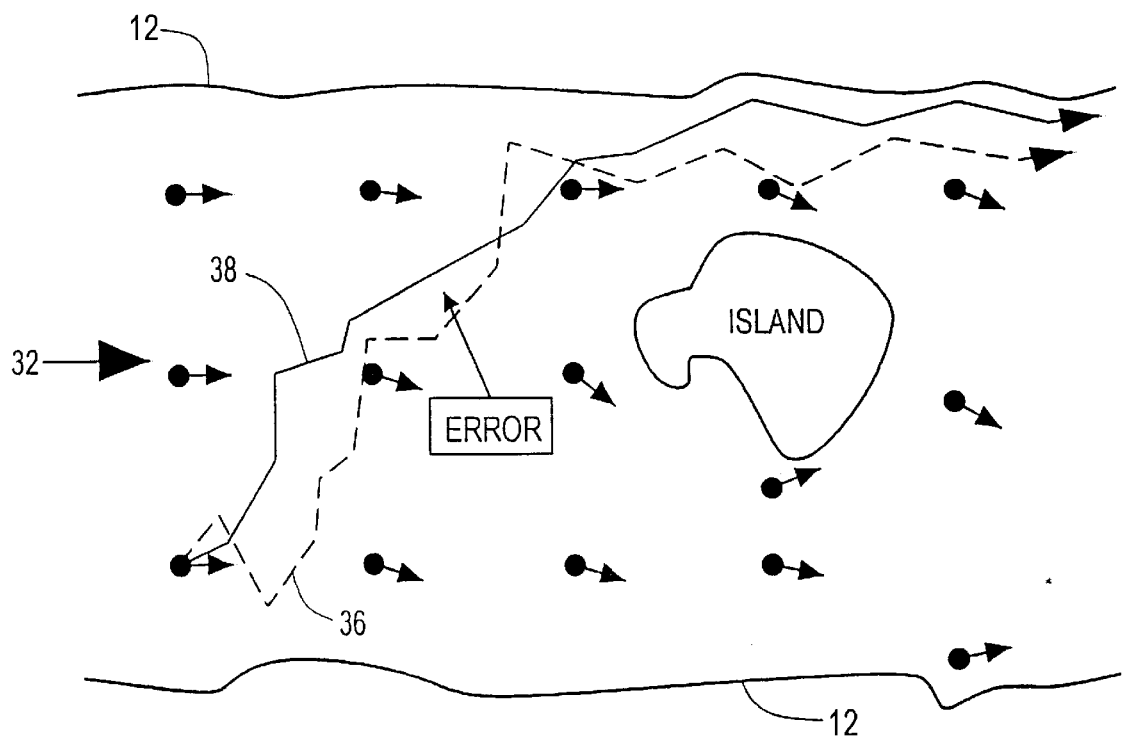
FIG. 4A is a plan view of an observed fish travel path and a predicted fish travel path.
Figure 4B:
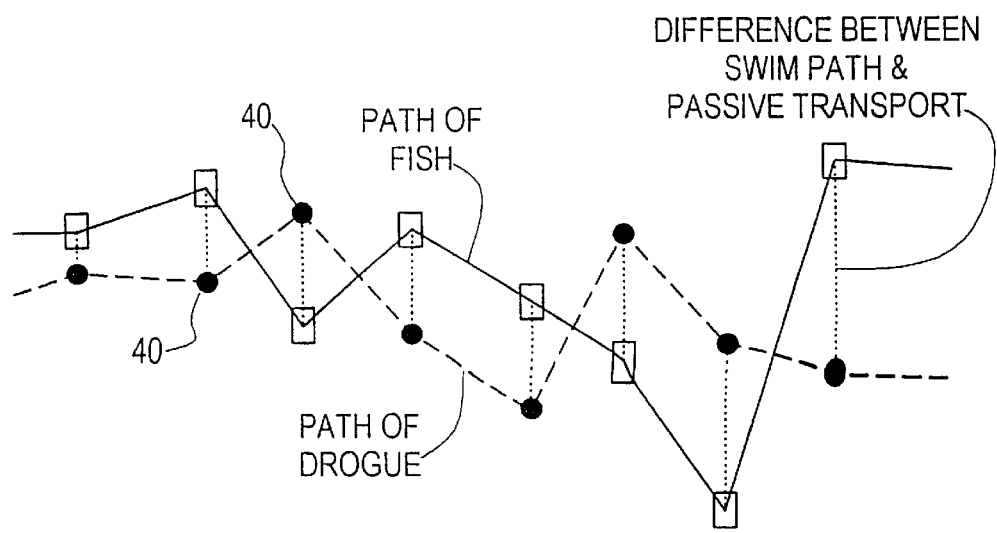
FIG. 4B is a plan view of an observed fish travel path and a neutrally buoyant drogue being passively transported.

In FIG. 4A, there are shown a predicted fish path 36 and an observed fish path 38 through 2-D hydraulic space in plan view.

The hydraulic (or acoustic) data can serve as a template on which behavioral data may be superimposed to evaluate the behavior of the target fish. Typically, behavioral data consist of traces of fish position as collected by split beam hydroacoustics, that is, a sampling method in which a specialized SONAR system is employed to locate fish in 3-D at time intervals of seconds to minutes, or data obtained from radio or acoustic-tagging studies, wherein some members of the target species are tagged with radio or acoustic tags and their positions in 3-D are determined at time intervals of seconds or minutes.

Figure 5:
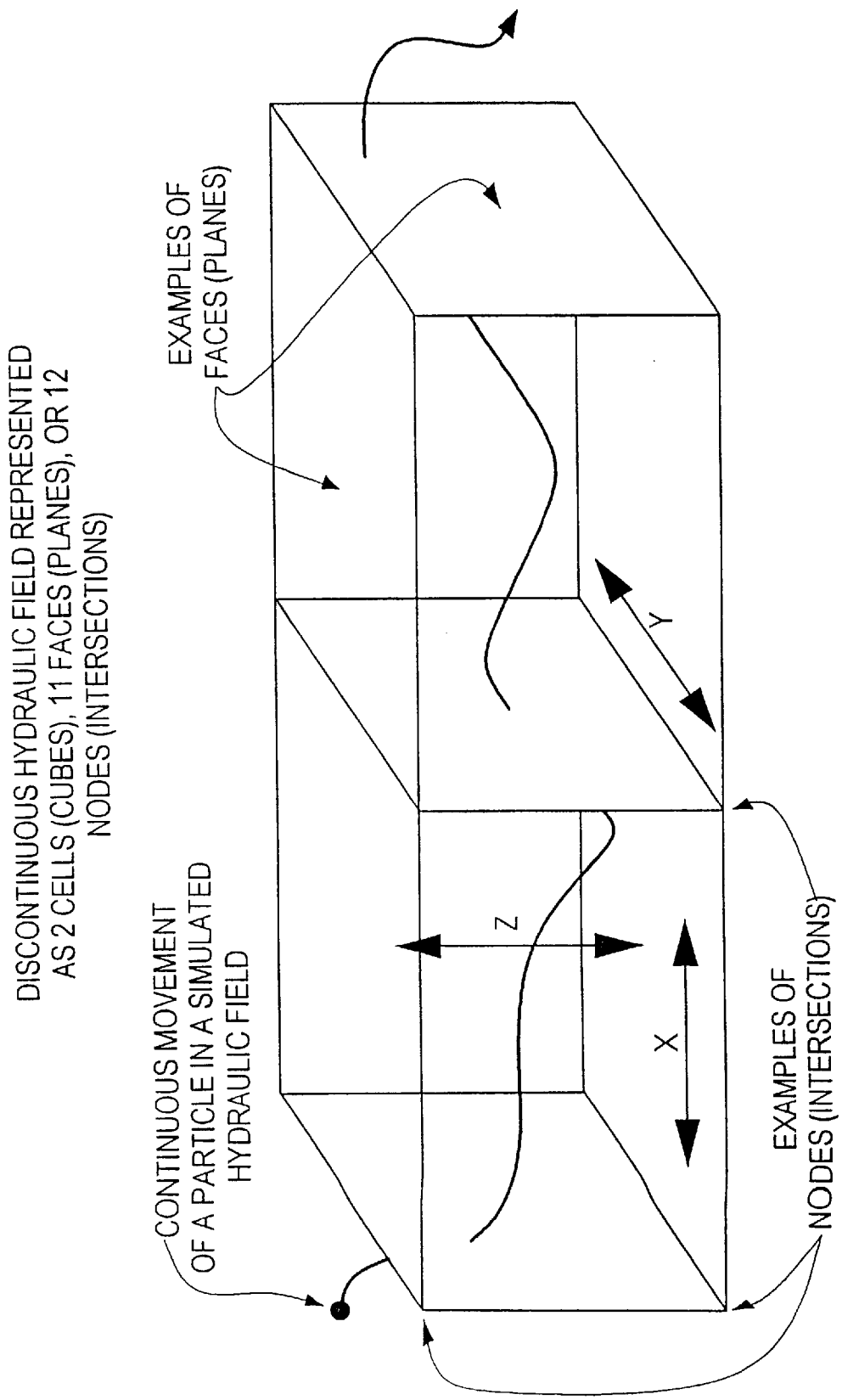
FIG. 5 is a diagrammatic illustration of output information available from a typical run of a hydraulic model, in accordance with the invention.

Step 2—Determining Passive Transport Trajectories of Members of the Aquatic Species Using Data on the Flow Field to Establish a Basis From Which to Determine Swim Path Selections Eulerian hydraulic models provide discontinuous information, that is, they provide information at a singular location within a cell, often at a node or cell face (FIG. 5). Therefore, it is not immediately possible to directly trace the path of a particle, or to simulate the movement of a fish, through such a model grid. The solution to this problem is the use of a particle tracking algorithm. A particle tracker is a computer algorithm that works by 1) obtaining hydraulic information at nodes or faces of a cell, 2) interpolating the hydraulic information to obtain values at various interior points in the cell, and 3) using the information at interior points of interest to move the particle in the cell (FIG. 6). The particle tracker emulates a path made by a neutrally buoyant particle that is passively transported.

Figure 6A:
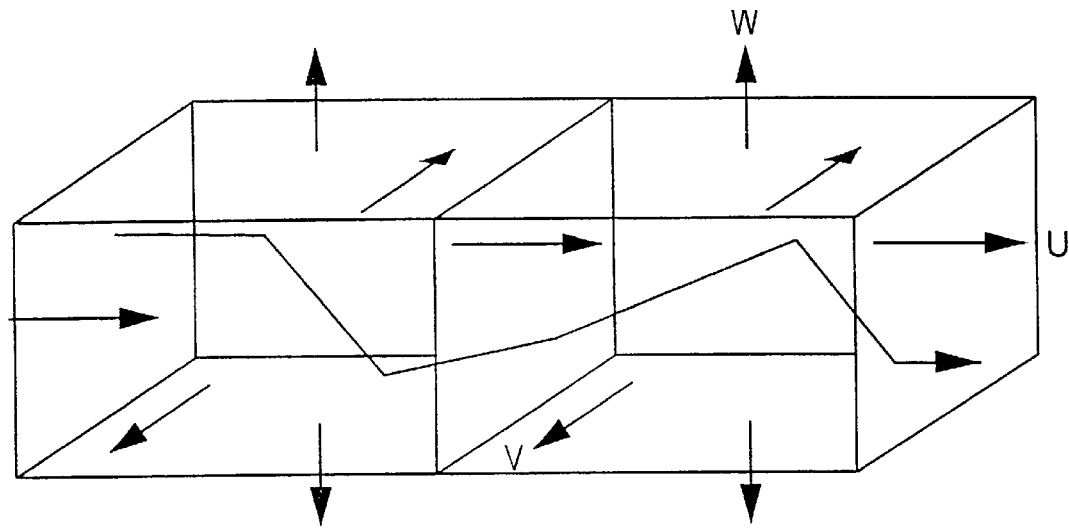
FIGS. 6A–6C diagrammatically illustrate velocity vectors at each face of the two-cell system of FIG. 5, which are used to interpolate velocity vectors at points of interest in the interior of the system (FIG. 6A). The interpolated interior velocity vectors are used to determine passive movement, or transport, of a neutrally buoyant object entrained in the flow field at incremental time steps, (FIG. 6B).
Figure 6B:
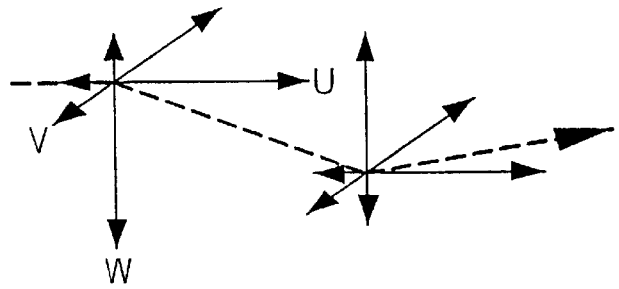
Figure 6C:
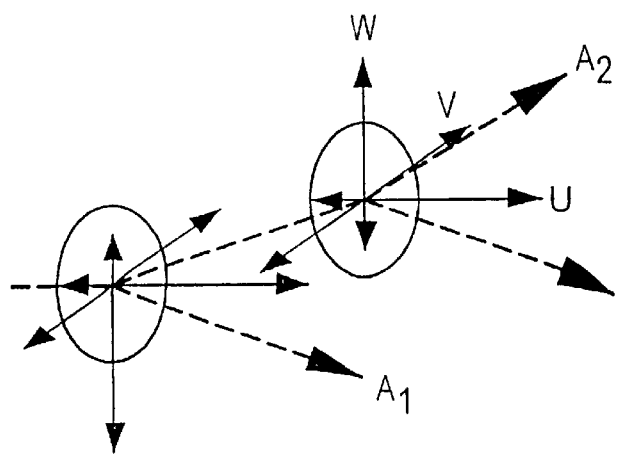

Referring to FIGS. 6A–6C, it will be seen that velocity vectors at each face in the two-cell system are used to interpolate the velocity vectors at points of interest in the interior of the system. These interpolated interior velocity vectors are used to determine movement of a neutrally buoyant object intrained in the flow field at incremental time steps (passive transport—FIG. 6B). Using this approach, a particle can be moved continuously through virtual space even though the hydraulic model or field measurements provide hydraulic information only at nodes or faces. As shown in FIG. 6C, simple passive particle transport is transformed into a swim path selected by a fish. Fish can be considered to exist as a particle in virtual space. Using their sensory systems, they are able to acquire hydraulic information in their immediate vicinity represented here by a 3-D eclipse. They use the information they acquire to make decisions about the swim path they will initiate in the aquatic environment.

The formulations in the particle tracker can be modified to provide the framework for simulating the swim path selection of fish or other aquatic organisms. Velocity vectors u (X-direction), v (Y-direction), and w (Z-direction) are obtained from the hydraulic model at points of interest. The vectors are then used to calculate the anticipated position of the virtual fish at the next time step assuming passive transport. If hydraulic conditions between the present and anticipated position are evaluated by an appropriate "traffic rule", the particle can be influenced to move in a manner different than simple passive transport (FIG. 6C). Use of rules based on fish behavior transform the passive particle to a virtual fish, thereby creating a numerical fish surrogate which emulates the movement of a real fish. That is, the virtual fish "swims" to new positions following a behavioral rule. In the FIG. 6 example, a virtual fish moves as a passive particle in the X- and Y-direction, but moves in the direction opposite to passive transport in the Z-direction. If the hydraulic cues, or "traffic rules", aquatic organisms use to navigate through the hydraulic environment can be estimated, then it is possible to program rules into particles behavior to create a new assessment tool. Beforehand, however, it is important to verify the accuracy of the hydraulic simulation component of the particle tracker using either a drogue or other accepted methods used in hydraulics engineering. If the particle tracker is properly programmed, calibrated, and verified, or if the field measurements of the hydraulic grid are accurate and of sufficient resolution, it is feasible to use virtual fish to assess the performance of different hydraulic structures, siting locations, or operational scenarios, to optimize the efficiency of the design without having to use the "build and test" paradigm.

Figure 7:
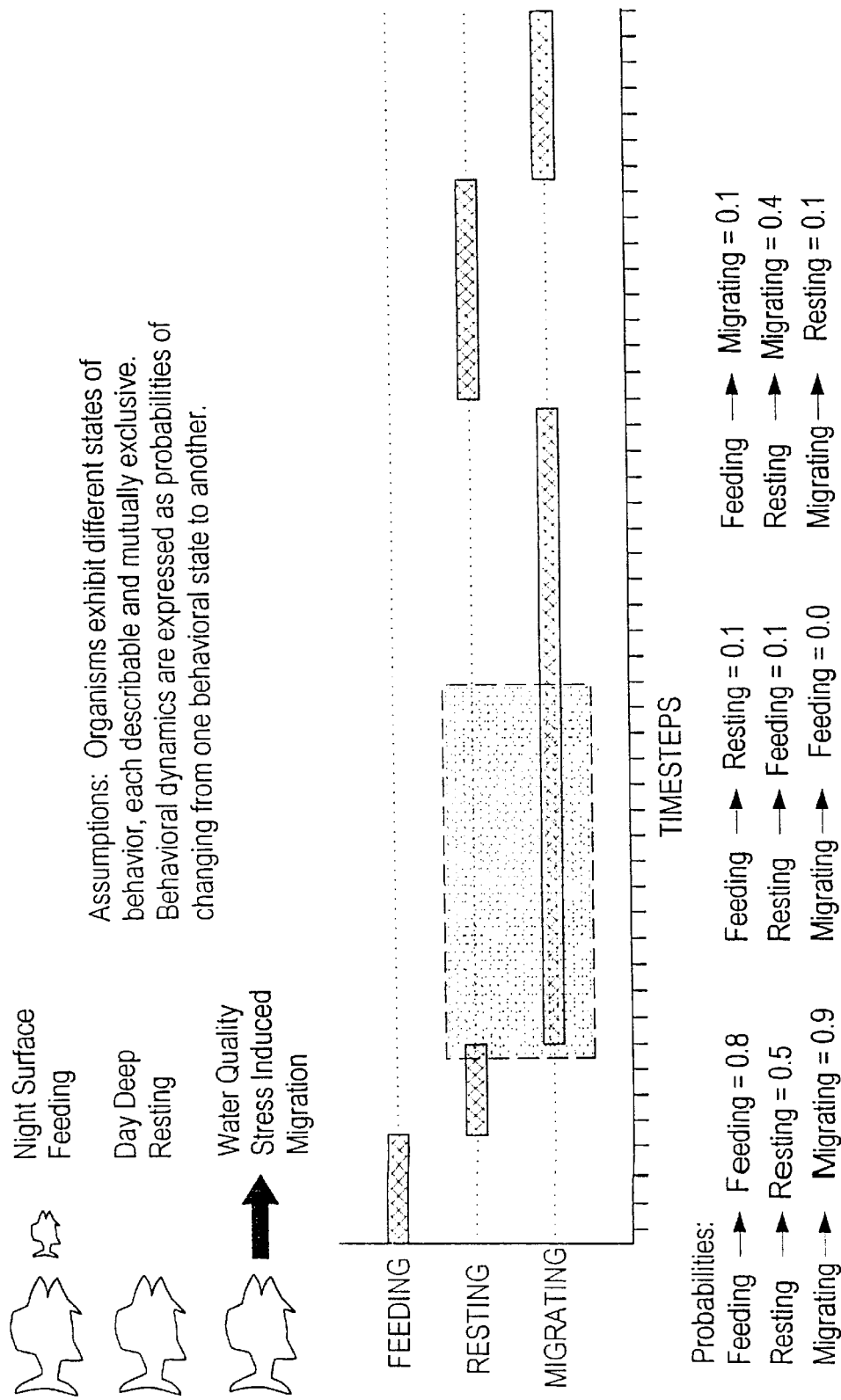
FIG. 7 is a chart illustrating the manner in which Markov chains are used to develop fish swim path selection rules necessary to simulate complex fish behavior.

Step 3—Developing Postulated Behavioral Responses of Members of the Aquatic Species to at Least One of Hydraulic and Acoustic Stimuli Using Statistical Rules Animal behaviorists often use continuous-time Markov chains (CTMC) for describing complex behavior of individual animals (see FIG. 7). A Markov chain can represent a dynamic system consisting of several distinct, mutually exclusive states with specific probabilities for changing between states. In a behavioral system, a Markov chain representation requires that an individual organism exists in one of a number of distinct, describable, and mutually exclusive behavioral states. For example, a fish can exist in three separate behavioral states: resting, feeding, and migrating, with unique probabilities of changing between states. For example, the probability of moving from a "feeding state" to a "resting state" is 0.1 at each time step. Within each state, rules can be established to predict the behavior of individual organisms. For example, in the migration state, a typical rule for adult behavior may be to maximally swim in the X-direction (i.e., to swim upstream against the current as fast as possible) and to select the Y-location that minimizes the downstream water velocity (i.e., find the lateral position in the channel that has the lowest U-velocity (in the X-direction) so the fish spends the least amount of energy needed to move upstream). The CTMC statistical model facilitates the reproduction of complex behavior using states of behavior and responses of organisms to hydraulic (or acoustic) information based on the current behavioral state. Different rules are employed within each distinct behavioral state since it is unlikely a fish, for example, will move similarly in the daytime as it will at night, nor would it move the same during spawning and non-spawning times. Most long-term applications of CTMCs require substantial numbers of states since the response of organisms to components in the flow field may change with water quality, time of day, seasons of the year, lifestage, time since last feeding, and other factors, which can all be represented as "states of behavior". State-specific random movement is captured by a scaled random displacement term that can be included for any spatial dimension being simulated. Optimum behavioral rules using CTMC are obtained by minimizing the error between predicted and observed swim path selections through the hydraulic field (FIG. 4A).

As illustrated in FIG. 7, continuous-time Markov chains can be used to develop the fish swim path selection rules necessary to simulate complex fish behavior based on hydraulic data available. A Markov chain can represent a system with multiple, mutually exclusive states where probabilities exist for changing from one state to another. As noted in the example above, a fish may exist in three separate states: resting, feeding, and migrating. Specific probabilities exist for changing from one state to another. Such a depiction is commonly used to quantify behavior of individual organisms. Within each state, rules can be established to predict the behavior of individual organisms.

Figure 3:
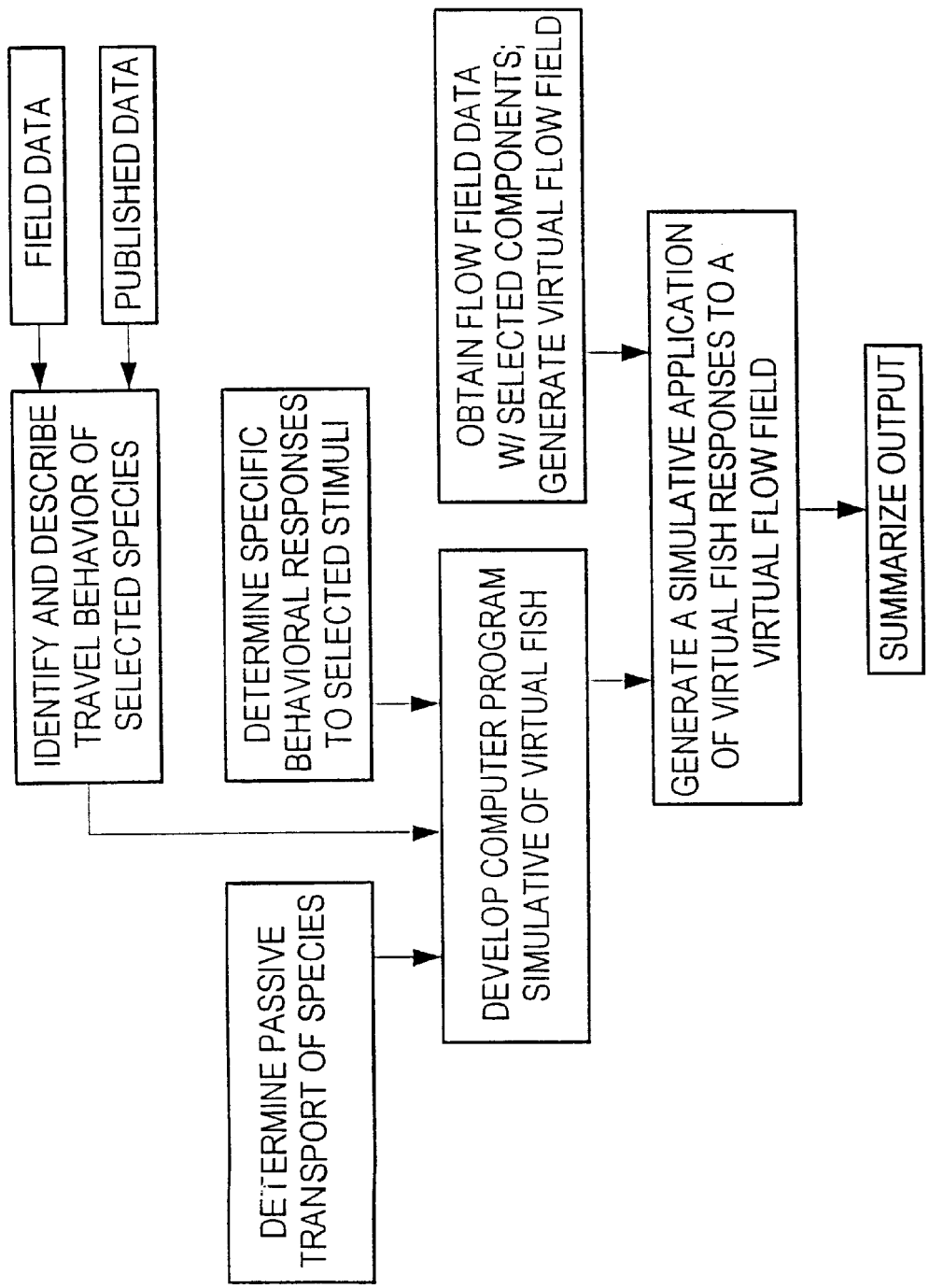
FIG. 3 is a flow chart illustrative of the inventive method.
Figure 8:
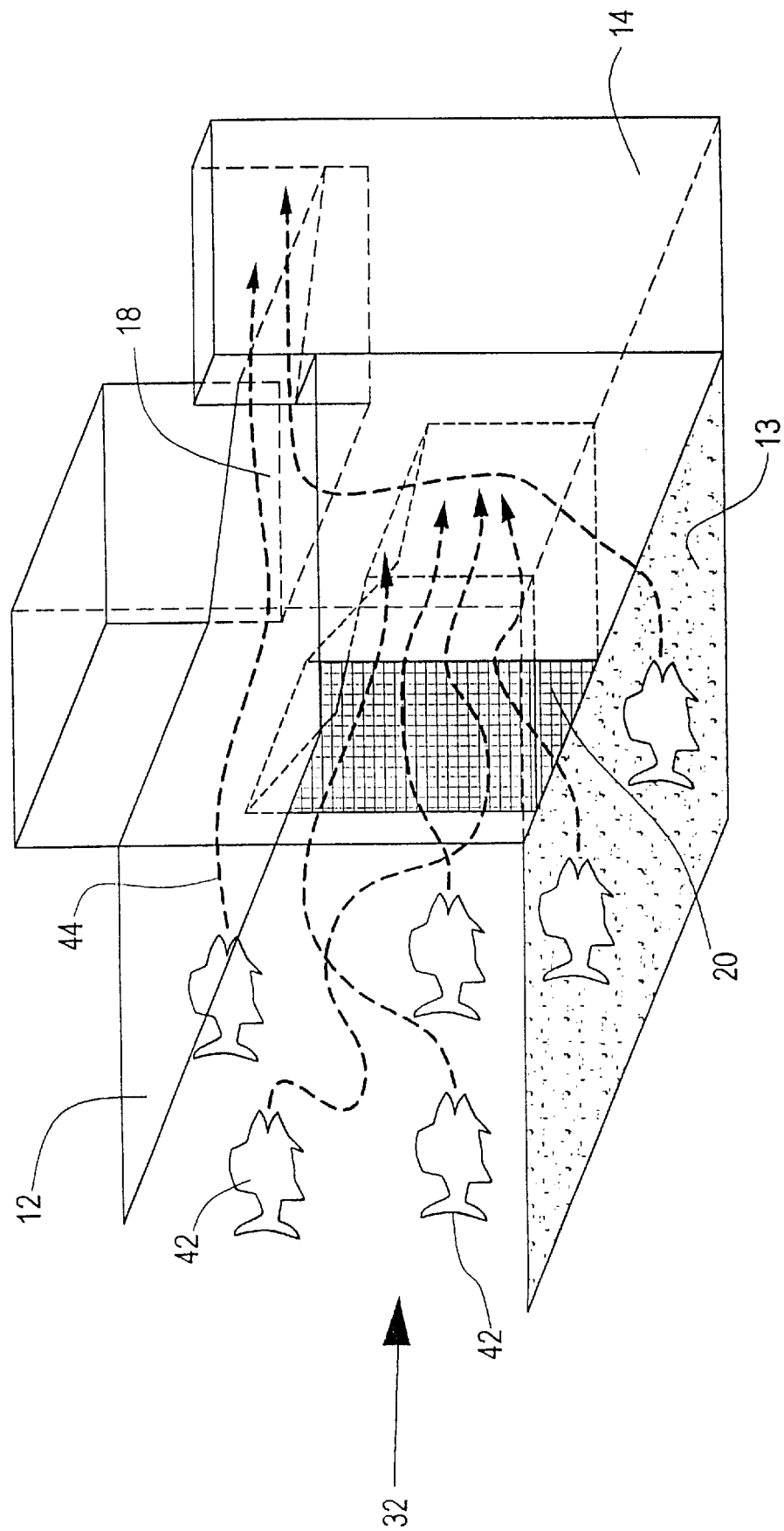
FIG. 8 is similar to FIG. 1 but illustrative of application of the method herein to predict and assess performance of a selected flow path design.

Step 4—Developing a Computer Program Utilizing Travel Behavior Data, Passive Transport Trajectories, and Postulated Behavioral Responses to Provide a Virtual Fish Incorporation of the CTMC structure into the particle tracker allows the prediction of swim path selection by real fish, which is manifested in the form of virtual fish 42 (FIG. 8). The program can be run to determine how many fish 42 use bypasses 18 compared to the total number of fish released into the virtual system. Similarly, the same strategy can be employed to determine the efficiency of other fish passage and protection problems. A large number of virtual fish, at least 1000, are introduced into the flow field 32. The virtual fish 42 exhibit swim path selections 44 based on the behavioral rules added to the particle tracking algorithm. The possible exit points from the system, in this case the bypass 18 and turbine intake 20, are monitored by the program. The percentage, or total number, of fish exiting the system through each possible exit for each alternative can then be determined. For model validation, the performance of the NFS should be evaluated against a data set independent of the data set used to develop the "traffic rules". This step of the invention can be linked to or embedded into population, community, water quality, and ecosystem models to allow impacts of different designs to be predicted and evaluated as part of environmental impact assessment (FIG. 3).

Step 5—Obtaining Data on at Least One Selected Hydraulic Flow Field Component to Generate a Virtual Hydraulic Flow Field Unique hydraulic fields are associated with every design, siting, size, and operational scenario. The hydraulic field can be simulated using 2- or 3-dimensional (preferred) high resolution hydraulic models. Alternatively, measurements of the flow field from scale models or from a prototype of the structure can be employed to reproduce the hydraulic fields. The present state-of-the-art in hydraulic engineering includes 3-D hydraulic models that are capable of providing the necessary hydraulic information. Accepted engineering methods should be followed, including calibration and verification, if mathematical hydraulic models are used, to insure the hydraulic model outputs accurate information.

Step 6—Generating a Simulative Application of a Multiplicity of Virtual Fish to the Virtual Hydraulic Flow Field, and Tracking and Monitoring the Virtual Fish Through the Virtual Flow Field The particle tracker with encoded behavioral rules is then applied to a system for testing alternative design scenarios. To evaluate fish passage designs, virtual fish are tallied by the route they use to exit each system (FIG. 8). Efficiency is determined by the number of virtual fish 42 exiting through the preferred passage route 18 divided by the total number released into the system. To evaluate fish protection designs, the number of virtual fish entering a "zone of jeopardy", such as an intake, is tallied. Efficiency can be determined by the number of virtual fish that enter the preferred passage 18 divided by the number of virtual fish released in the system.

Step 7—Summarizing Results as to Numbers of Virtual Fish Entering and Exiting Through Specific Locations of the Virtual Flow Field, to Determine Probable Efficiency of Real Fish Passage Through the Real Hydraulic Flow Field A table that summarizes the results is prepared (FIG. 9) listing each alternative, its cost, and its effectiveness. The optimum alternative based on efficiency, cost, or incremental basis is identified.

In FIG. 9, there is shown an illustrative summary output obtained from releasing 1000 virtual fish into the hydraulic grid associated with four different, independent, hypothetical design alternatives: (1)a 5,000 ft$^3$/sec modified operating scenario for the dam, with no structural modifications; (2)a wide bypass comprising a downstream fish bypass system having a channel width of 15 ft; (3) a narrow bypass similar to the wide bypass but only 10 feet in width; and (4) installation of a diversion screen. Different criteria can be used to select the optimum design. In terms of maximum efficiency, the screen is the best alternative because it has a bypass efficiency, that is, the number of fish utilizing the bypass divided by the total number of fish passing the dam, of 62%. The least expensive alternative is the 5,000 ft$^3$/sec operating scenario, at a cost of $0.50M. The optimum choice, on a unit basis, is the wide bypass having a unit cost of $1,364.00 per fish passed.

There is thus provided a method for determining probable response of aquatic species to selected components of water flow fields, which, in turn, provides for comparative testing of alternative designs of flow passage and flow passage components, such as dam bypasses, screens, grids, baffles, and the like, without the need for expensive and time consuming build-and-test undertakings.

It is to be understood that the present invention is by no means limited to the particular order of method steps herein disclosed and/or shown in the drawings, but also comprises any equivalent modifications. For example, it is clear that the step of obtaining data for one or more selected hydraulic flow fields can be undertaken before, during, or after obtaining field data for fish, and/or undertaking any of the other data gathering and programming steps relative to production of virtual fish. Further, while the descriptive term "fish" is used herein and in the claims that follow, it should be understood that such "fish" are intended to include aquatic species such as turtles, shrimp, prawns, lobsters, and the like. Still further, while the above description is directed to travel of "fish" in "hydraulic flow fields", it will be clear that the invention applies to those bodies of water which may not be considered for some purposes "hydraulic flow fields", such as, for example, bodies of water having natural components therein, rather than man-made components such as dams, and the like.

What is claimed is:

1. Method for determining the probable response of aquatic species to selected components of water flow fields, the method comprising the steps of:

obtaining data for identifying and quantitatively describing travel behavior of real fish constituting members of a selected aquatic species in a flow field;

determining passive transport trajectories of members of the aquatic species using data on the flow field to establish a basis from which to determine swim path selections;

determining postulated behavioral responses of members of the aquatic species to at least one of hydraulic and acoustic stimuli using statistical rules;

utilizing said travel behavior data of real fish in the flow field, said passive transport trajectories of real fish in the flow field, and said postulated behavior responses of real fish to stimuli, developing a computer program adapted to predict swim path selections by the real fish, such predictions being manifested in the form of virtual fish;

obtaining data on at least one selected hydraulic flow field component, to generate a virtual hydraulic flow field;

generating a simulative application of a multiplicity of virtual fish to the virtual hydraulic flow field, and tracking and monitoring the virtual fish through the virtual flow field; and summarizing results as to the numbers of the virtual fish entering and exiting through specific locations of the virtual flow field;

whereby to determine the probable response of real fish to the selected components of a real hydraulic flow field.

2. The method in accordance with claim 1, wherein obtaining data for identifying travel behavior of real fish constituting members of the selected aquatic species comprises at least a selected one of (1) tracing real fish positions as collected by monitoring hydroacoustics in a real water flow field; and (2) obtaining data on real fish from tagging studies conducted in a real water flow field.

3. The method in accordance with claim 2, wherein said field data is stored in a memory portion of a computer.

4. The method in accordance with claim 3, wherein said passive transport of the members of the aquatic species in the flow field is determined by at least one of (1) simulating a flow path of a neutrally buoyant particle passively transported in the flow field, and (2) tracing a flow path of a drogue through a selected one of a real flow field and a scaled physical model of a real flow field.

5. The method in accordance with claim 4, wherein said passive transport is stored in a memory portion of a computer to provide simulated passive transport.

6. The method in accordance with claim 5, wherein determining behavioral responses of the members of the aquatic species to hydraulic and acoustic stimuli comprises determining probabilities of the members moving from one state exhibited by said members to any other state exhibited by said members, to establish rules to predict behavior of individual ones of said members.

7. The method in accordance with claim 6, wherein said rules to predict behavior are stored in a memory portion of a computer.

8. The method in accordance with claim 7, wherein the computer program predicts the swim path selection by the real fish by providing a virtual fish simulating the predicted swim path of the real fish.

9. The method in accordance with claim 8, wherein obtaining data for at least one selected flow field component comprises obtaining data from at least a selected one of (1) a mathematical hydraulic model, (2) a scale model of the hydraulic field, and (3) use of measuring instruments in the real flow field; and said hydraulic field data is entered into the computer program.

10. The method in accordance with claim 9, wherein said data obtained for said selected flow field is used to generate a virtual hydraulic flow field.

11. The method in accordance with claim 10, wherein the generating of a simulative application of the virtual fish to the virtual hydraulic flow field comprises overlaying all virtual fish behavioral rules on top of said virtual hydraulic flow field.

12. The method in accordance with claim 11, wherein the summarizing of numbers of virtual fish entering and exiting the virtual hydraulic flow field at specific locations further comprises summarizing of numbers of virtual fish affected by obstacles disposed in said hydraulic flow field.

13. The method in accordance with claim 1, wherein obtaining data for identifying travel behavior of real fish comprises at least one of obtaining field data and obtaining published data.

14. The method in accordance with claim 1 wherein the step of obtaining data on said selected hydraulic flow field component to generate said virtual hydraulic flow field further comprises obtaining environmental data relating to water in said flow field.

15. The method in accordance with claim 14 wherein said environmental data comprises at least water quality data.

16. Method for determining the probable response of aquatic species to selected components of water flow fields, the method comprising the steps of:

obtaining data for identifying and quantitatively describing travel behavior of real fish constituting members of a selected aquatic species in a water field;

determining passive transport trajectories of members of the aquatic species using data on the water field to establish a basis from which to determine swim path selections;

determining postulated behavioral responses of members of the aquatic species to at least one of hydraulic and acoustic stimuli using statistical rules;

utilizing said travel behavior data of real fish in the flow field, said passive transport trajectories of real fish in the flow field, and said postulated behavior responses of real fish to stimuli, developing a computer program adapted to predict swim path selection by the real fish, such predictions being manifested in the form of a virtual fish;

obtaining data on at least one selected water field component, to generate a virtual water field;

generating a simulative application of a multiplicity of virtual fish to said virtual water field, and tracking and monitoring the virtual fish through said virtual water field; and summarizing results as to the numbers of said virtual fish entering and exiting through specific locations of said virtual water field;

whereby to determine probable response of real fish to the selected components of a real water flow field.

* * * * *